July 13, 1948.   P. A. DRISCOLL   2,445,057
SEALING ARRANGEMENT
Filed Nov. 8, 1944   2 Sheets-Sheet 1

INVENTOR
PAUL A. DRISCOLL
BY
T. J. Plante
ATTORNEY

July 13, 1948. P. A. DRISCOLL 2,445,057
SEALING ARRANGEMENT
Filed Nov. 8, 1944 2 Sheets-Sheet 2

INVENTOR
PAUL A. DRISCOLL
BY
*T. J. Plante*
ATTORNEY

Patented July 13, 1948

2,445,057

UNITED STATES PATENT OFFICE 2,445,057

SEALING ARRANGEMENT

Paul A. Driscoll, South Bend, Ind., assignor to Bendix Aviation Corporation, South Bend, Ind., a corporation of Delaware Application November 8, 1944, Serial No. 562,547

6 Claims. (Cl. 309—23)

This invention relates to sealing arrangements used in hydraulic pressure systems.

Among the requirements for effective sealing of such systems are the maintenance of a good seal under relatively low pressures, and the prevention of leakage due to contraction and hardening of the sealing material as the temperature becomes very cold. To some extent, sealing problems are complicated by the substitution of synthetic rubber for natural rubber as the material from which the sealing devices are made, since the synthetic material has less resilience and is more likely to take a set as a result of long usage and low temperatures.

An object of the present invention is to provide a sealing arrangement which will improve the effectiveness of the seal in a hydraulic pressure system, particularly when the liquid is under relatively low pressure.

A further object of the present invention is to provide a sealing arrangement which will be effective at very cold temperatures, when the material of the sealing device tends to stiffen and lose its recovery characteristics.

Other objects and advantages of the present invention will become apparent during the following description, reference being had therein to the accompanying drawings, in which.

Figure 1:
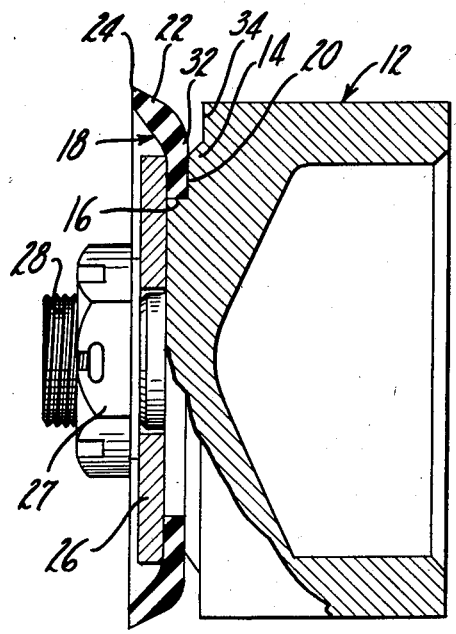
Figure 1 is a cross-sectional view showing a piston and seal for a hydraulic cylinder formed according to my invention, the piston and seal being shown in position prior to insertion in the cylinder.
Figure 2:
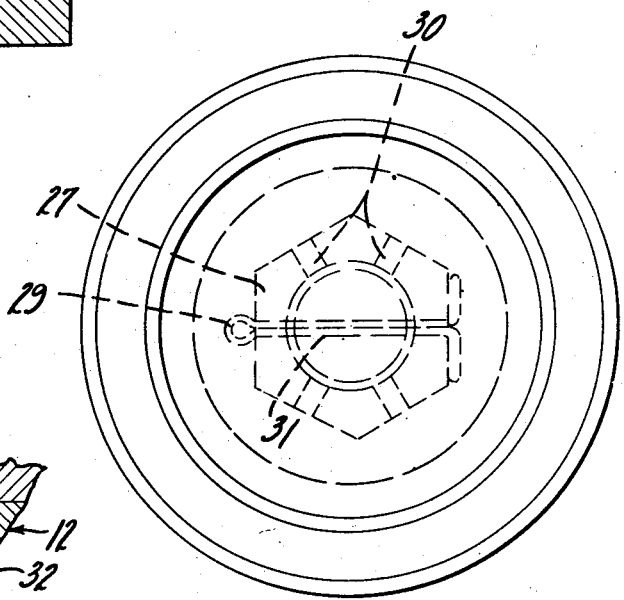
Figure 2 is a rear elevation showing the arrangement of Figure 1.
Figure 3:
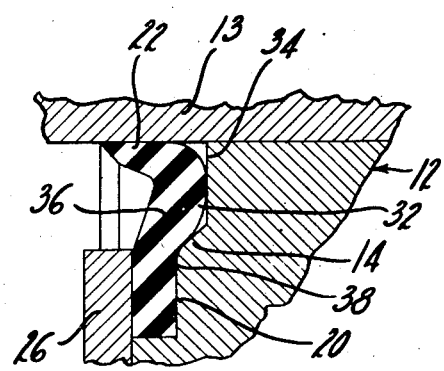
Figure 3 is an enlarged view showing the position of the sealing member of Figure 1 in the cylinder and under pressure.

Referring to Figures 1 to 3 inclusive, a piston 12 is adapted to reciprocate in a cylinder 13, such, for example, as the wheel cylinder of a hydraulic brake system. The forward or inner end of the piston 12 is stepped to provide reduced diameter portions 14 and 16, the portion 16 having the least diameter, whereas the diameter of the portion 14 is greater than the least diameter but less than the full diameter of the piston.

An annular sealing device 18 has a base portion which is adapted to fit over the small diameter end of the piston 12 and to lie against the surface 20 formed on the piston between the small diameter portion 16 and the intermediate diameter portion 14. The sealing member 18 is provided with an annular lip 22 extending axially inwardly or forwardly from the piston, or in other words, in the direction from which the operating fluid is to come. Before insertion of the piston and seal in the cylinder, the lip 22 preferably has the radially outward slant shown in Figure 1, which causes it to press tightly against the cylinder wall when inserted in the cylinder. In other words, the lip is substantially frusto-conical in shape, with its large diameter edge 24 farthest from the body of piston 12.

A washer 26 may be used to clamp sealing element 18 in position on the face of piston 12, the washer 26 being retained by a nut 27 screwed onto a threaded projection 28 extending from the piston 12. To lock nut 27 in position, a cotter 29 may be used, a plurality of aligned openings 30 being provided in the nut in order that the opening 31 through threaded extension 28 may be brought into line with a pair of such openings to receive the cotter.

Once the sealing element 18 and piston 12 have been assembled and inserted in the cylinder, the outward pressure of lip 22 against the cylinder wall depends upon the resilience of the material of sealing element 18 and upon the pressure of the liquid in the cylinder against the lip 22. Any tendency of the material of the sealing element to take a set or to shrink due to excessive cold increases the danger of liquid leakage past the lip of the sealing element. This is particularly important when the liquid is at a relatively low pressure, because it cannot then provide effective assistance in maintaining the seal.

The present arrangement is such that the outer part of the cup normally stands away from the piston, and when pressure is exerted on the lip the outer part of the cup is distorted until it is backed up by the piston.

The reduced diameter portion 14 of piston 12 is provided for the purpose of relieving the piston surface at the rear of sealing element 18, thereby permitting said sealing element to assume, when it is put under pressure, the position shown in Figure 3, wherein the rear surface 32 of sealing element 18 is forced back against the surface 34 of the piston, bending the annular portion 36 of the base of the sealing element with respect to that portion of the base which is clamped between washer 26 and surface 20 of the piston. The tendency of lip 22 to maintain its original angle with respect to the contiguous portion of the base of the sealing element increases the outward pressure of the lip against the cylinder wall, and thereby provides a more effective seal. In order to avoid cutting the rear surface of the sealing element, the edge 38 over which it is bent is formed at a relatively small angle to surface 20, as shown, giving the intermediate diameter portion 14 of the inner end of piston 12 a frusto-conical shape.

Cramping the lip of the sealing element into tighter contact with the cylinder wall, as described, tends to prevent low pressure leaks, because the angle between the lip and the contiguous part of the base is decreased, and a greater pressure is exerted as the lip tries to regain its original position with respect to the base of the sealing element. Furthermore, as the cup tends to regain its normal position after the pressure in the cylinder has been reduced, there is a drag on the lip 22 which tends to pull it more tightly against the cylinder wall, or, in other words, to wedge it between the base of the sealing element and the wall. The latter advantage is particularly effective at very cold temperatures when the material of the sealing element tends to become stiff and to lose its recovery characteristics.

Figure 4:
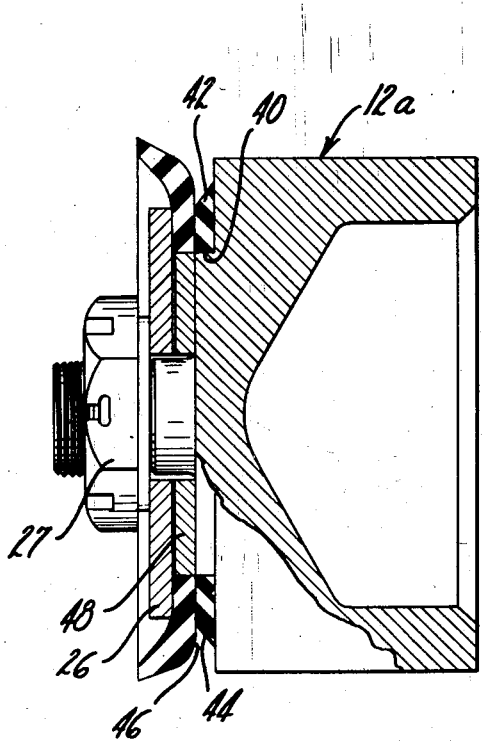
Figure 4 is a cross-sectional view showing a modified version of my invention in the position prior to insertion in the cylinder.
Figure 5:
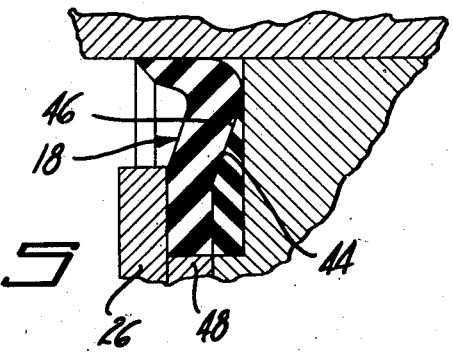
Figure 5 is an enlarged partial section showing the position of the sealing device of Figure 4 in the cylinder and under pressure.

The version of the invention illustrated in Figures 4 and 5 is particularly intended to simplify application of the invention to structures already in service. In this case the piston 12a has a single reduced diameter portion 40 formed on its inner end, and a separate annular member 42, which may be formed of rubber material if desired, is supported on the portion 40 of the piston. The member 42 provides a sloping surface 44 against which the outer part 46 of the rear surface of sealing element 18 is adapted to lie when pressure is built up in the liquid. Plate 48 is used to center sealing element 18, and the parts are maintained in position by a washer 26 and nut 27, as in the preceding version. As before, the surface 44 of member 42 is tapered to avoid rolling the sealing element over a sharp edge.

Although certain particular embodiments of my invention have been described, it will be understood by those skilled in the art that the object of the invention may be attained by the use of constructions different in certain respects from those disclosed without departing from the underlying principles of the invention. I therefore desire by the following claims to include within the scope of my invention all such variations and modifications by which substantially the results of my invention may be obtained through the use of substantially the same or equivalent means.

I claim:

1. In a cylinder for a hydraulic pressure system, a piston having a stepped inner end and a threaded projection thereon, an annular seal formed of yieldable resilient material having a base portion encircling the small diameter innermost portion of the stepped piston end and having a forwardly extending lip pressing outwardly against the cylinder wall, said lip originally having a substantially frusto-conical form with the large diameter farthest from the piston, the stepped inner end of the piston having a portion of diameter less than the full piston diameter but greater than the seal encircled small diameter, thereby relieving the piston surface behind the seal to provide an annular space into which the outer portion of the base of the seal can be forced by the pressure of the fluid, the intermediate diameter portion being frusto-conical to provide a gradually decreasing diameter toward the inner end of the piston, a washer lying against the face of the piston and against the front of the base portion of the seal to retain the same in position, and a nut screwed on the threaded projection of the piston to clamp the washer against the piston face and seal.

2. In a cylinder for a hydraulic pressure system, a piston having a stepped inner end and a threaded projection thereon, an annular seal formed of yieldable resilient material having a base portion supported on the inner end of the piston and having a forwardly extending lip pressing outwardly against the cylinder wall, said lip originally having a substantially frusto-conical form with the large diameter farthest from the piston, the stepped inner end of the piston having a portion of diameter less than the full piston diameter, thereby relieving the piston surface behind the seal to provide an annular space into which the outer portion of the base of the seal can be forced by the pressure of the fluid, the reduced diameter portion being frusto-conical to provide a gradually decreasing diameter toward the inner end of the piston, a washer lying against the face of the piston and against the front of the base portion of the seal to retain the same in position, and a nut screwed on the threaded projection of the piston to clamp the washer against the piston face and seal.

3. In a cylinder for a hydraulic pressure system, a piston having a stepped inner end, and an annular seal formed of yieldable resilient material having a base portion supported on the inner end of the piston and having a forwardly extending lip pressing outwardly against the cylinder wall, said lip originally having a substantially frusto-conical form with the large diameter farthest from the piston, the stepped inner end of the piston having a portion of diameter less than the full piston diameter, thereby relieving the piston surface behind the seal to provide an annular space into which the outer portion of the base of the seal can be forced by the pressure of the fluid, the reduced diameter portion being frusto-conical to provide a gradually decreasing diameter toward the inner end of the piston.

4. In a cylinder for a hydraulic pressure system, a piston having a stepped inner end, and an annular seal formed of yieldable resilient material having a base portion supported on the inner end of the piston and having a forwardly extending lip pressing outwardly against the cylinder wall, the stepped inner end of the piston having a portion of diameter less than the full piston diameter, thereby relieving the piston surface behind the seal to provide an annular space into which the outer portion of the base of the seal can be forced by the pressure of the fluid, the reduced diameter portion being frusto-conical to provide a gradually decreasing diameter toward the inner end of the piston.

5. In a cylinder for a hydraulic pressure system, a piston having a stepped inner end, and an annular seal formed of yieldable resilient material having a base portion supported on the inner end of the piston and having a forwardly extending lip pressing outwardly against the cylinder wall, the stepped inner end of the piston having a small diameter portion which supports the seal and an intermediate diameter portion which relieves the piston surface behind the seal to provide an annular space into which the outer portion of the base of the seal can be forced by the pressure of the fluid, the base portion of the seal lying against the piston face formed between the small and intermediate diameters.

6. In a cylinder for a hydraulic pressure system, a piston having a stepped inner end providing two annular shoulders in addition to the face of the piston, and an annular seal formed of yieldable resilient material having a base portion carried by the inner end of the piston and backed by one of the aforementioned annular shoulders, said seal having a forwardly extending lip pressing outwardly against the cylinder wall, the outer portion of the base of the seal being adapted to be forced against the second of the aforementioned shoulders under pressure of fluid in front of the piston.

PAUL A. DRISCOLL.

REFERENCES CITED

The following references are of record in the file of this patent:

UNITED STATES PATENTS

| Number | Name | Date |
|---|---|---|
| 1,788,223 | Wisner | Jan. 6, 1931 |
| 2,018,205 | Evans | Oct. 22, 1935 |
| 2,059,444 | Dick | Nov. 3, 1936 |
| 2,097,612 | Arnold | Nov. 2, 1937 |
| 2,284,424 | Hein | May 26, 1942 |
| 2,368,744 | Carey | Feb. 6, 1945 |

FOREIGN PATENTS

| Number | Country | Date |
|---|---|---|
| 289,113 | England | Apr. 26, 1928 |